United States Patent
Paris et al.

(10) Patent No.: US 12,152,151 B2
(45) Date of Patent: Nov. 26, 2024

(54) ADHESIVE MIXTURE HAVING AN ORGANIC SLURRY DISPERSION AND PROCESS FOR MANUFACTURE THEREOF

(71) Applicant: The Willamette Valley Company LLC, Eugene, OR (US)

(72) Inventors: Jesse L. Paris, Eugene, OR (US); Sudip Chowdhury, Eugene, OR (US); Robert Joe Rubash, Eugene, OR (US); Kyleigh Danielle Rhodes, Eugene, OR (US)

(73) Assignee: The Willamette Valley Company LLC, Eugene, OR (US)

( * ) Notice: Subject to any disclaimer, the term of this patent is extended or adjusted under 35 U.S.C. 154(b) by 57 days.

(21) Appl. No.: 17/706,903

(22) Filed: Mar. 29, 2022

(65) Prior Publication Data
US 2023/0312929 A1     Oct. 5, 2023

(51) Int. Cl.
*C08L 97/02*      (2006.01)
*C08L 61/06*      (2006.01)

(52) U.S. Cl.
CPC ............. *C08L 97/02* (2013.01); *C08L 61/06* (2013.01); *C08L 2201/50* (2013.01); *C08L 2205/025* (2013.01); *C08L 2205/035* (2013.01); *C08L 2205/16* (2013.01)

(58) Field of Classification Search
CPC ....... C08L 97/02; C08L 61/06; C08L 2201/50
See application file for complete search history.

(56) References Cited

U.S. PATENT DOCUMENTS

| | | |
|---|---|---|
| 2,660,567 A | 11/1953 | Cunder et al. |
| 4,340,500 A | 7/1982 | Boylan |
| 4,612,051 A | 9/1986 | Miller, Jr. et al. |
| 4,752,319 A | 6/1988 | DelliColli |
| 5,635,024 A | 6/1997 | Shall |
| 2005/0017829 A1 | 8/2005 | Kalbitz et al. |

(Continued)

FOREIGN PATENT DOCUMENTS

| | | |
|---|---|---|
| CL | 200302347 | 1/2005 |
| CL | 201200451 | 4/2013 |

(Continued)

OTHER PUBLICATIONS

International Search Report and Written Opinion received for Application No. PCT/US2023/064985 mailed Jul. 10, 2023 (8 pages).

(Continued)

*Primary Examiner* — John E Uselding
(74) *Attorney, Agent, or Firm* — Crowell & Moring LLP (57) ABSTRACT

An adhesive mixture comprising an organic slurry dispersion for use in the manufacture of wood-based composites is described herein. The adhesive mixture includes an adhesive resin; water; one or more fillers, and an organic slurry dispersion. The organic slurry dispersion includes water; a natural biopolymer insoluble in the water, the natural biopolymer comprising lignocelluloses, lignocellulosic agricultural residue, lignin materials, lignin derivatives or mixtures thereof; and a defoamer. During manufacturing, the components of the organic slurry dispersion are combined and mixed by imparting a high degree of shear and mixing. The adhesive mixture may be applied to wood material for use in manufacturing a wood-based composite product.

19 Claims, 6 Drawing Sheets

(56) References Cited

U.S. PATENT DOCUMENTS

| | | | |
|---|---|---|---|
| 2007/0181035 | A1 | 8/2007 | Wantling et al. |
| 2008/0047674 | A1 | 2/2008 | Ohman et al. |
| 2011/0149390 | A1 | 6/2011 | Petersen et al. |
| 2011/0251306 | A1 | 10/2011 | Theberge et al. |
| 2012/0214012 | A1 | 8/2012 | Briner et al. |
| 2013/0042792 | A1 | 2/2013 | Stuart et al. |
| 2015/0159017 | A1 | 6/2015 | Ayambem et al. |
| 2015/0210904 | A1 | 7/2015 | Cothran et al. |
| 2015/0284566 | A1 | 10/2015 | Sniady et al. |
| 2015/0315439 | A1 | 11/2015 | Berlin |
| 2016/0006036 | A1 | 1/2016 | Maruyama et al. |
| 2016/0160016 | A1 | 6/2016 | Lundgard et al. |
| 2019/0382582 | A1 | 12/2019 | Paris et al. |
| 2021/0238464 | A1 | 8/2021 | Nasli Bakir et al. |

FOREIGN PATENT DOCUMENTS

| | | |
|---|---|---|
| CN | 1090914 A | 8/1994 |
| CN | 103305053 A | 9/2023 |
| WO | WO 91/04990 | 4/1991 |
| WO | WO 2004/044086 A1 | 5/2004 |
| WO | WO 2010/054467 A1 | 5/2010 |

OTHER PUBLICATIONS

Kowalczyk et al., Physiocochemical and Antioxidant Properties of Biopolymer/Candelilla Wax Emulsion Films Containing Hop Extract—a Comparative Study, Food Hydrocolloids, Elsevier BV, Netherlands, vol. 69, Apr. 9, 2016, pp. 384-392, ISSN: 0268-005X, DOI: 10.1016/J. FOODHYD (9 pages).

ADHESIVE MIXTURE HAVING AN ORGANIC SLURRY DISPERSION AND PROCESS FOR MANUFACTURE THEREOF

BACKGROUND

1. Technical Field

This disclosure relates to wood-based composites, the components used to manufacture wood-based composites and the methods for manufacturing wood-based composites. This disclosure further relates to the use of adhesive mixtures in the manufacture of wood-based composites.

2. Background Information

Wood-based composites are generally manufactured by binding strands, particles, fibers, or furnish of one or more types of wood together with adhesive. Wood-based composites may include, but are not limited to, oriented strand board (OSB), particle board, plywood, waferboard, chipboard, medium-density fiberboard, parallel strand lumber, oriented strand lumber (OSL), and laminated strand lumber.

For the production of wood-based composites products, such as plywood, an adhesive mixture, also known as a gluemix, may be used. One of the most common gluemixes used for plywood are resol-type phenol-formaldehyde resin based gluemixes. These gluemixes may include water, pH modifiers (such as sodium hydroxide and/or soda ash), and other additives, like fillers and extenders, intended to enhance performance with the overall goal of reducing total resin, and thus raw material costs, necessary for sufficient bond quality.

The type of filler used in the manufacture of wood-based composite products like plywood can have a drastic effect on the stability, rheology, and performance of a gluemix. Premium fillers are known to, amongst other things, increase gluemix stability, increase glue mix homogeneity and resistance to phase separation; offer greater tolerance to higher moisture veneers; improve application consistency; and offer a greater operating window (i.e. increasing the working time/process flexibility from glue application to adhesive cure. With regard to providing a greater operating window, premium fillers do so by resisting dryout of the gluemix on the veneer surface and resisting over-penetration of the gluemix into the substrate. Thus, these premium fillers are known to allow for reduced adhesive application levels, improved pre-press consolidation, and excellent bond quality. However, the cost and availability of premium fillers may be a limiting factor for some plywood or resin manufacturers. While other more cost affordable filler options may be used, they do not have the same value-add benefits found in the premium fillers.

Thus, there is a need for a gluemix that utilizes fillers that is more cost effective and that also provides the increased performance contributions of premium fillers. Furthermore, it is desirable for an additive to a gluemix that may be used to improve and enhance the value and performance of other, more commodity filler materials that have less substantial improvements than known premium fillers. Moreover, it is desirable to provide a delivery mechanism for dispersing a beneficial additive in a water-based system at neutral to low pH in order to minimize safety risks.

BRIEF SUMMARY

In a first aspect of the invention, an adhesive mixture, includes an adhesive resin; water; one or more fillers and extenders, and an organic slurry dispersion. The organic slurry dispersion includes water; a natural biopolymer insoluble in the water, the natural biopolymer comprising lignocelluloses, lignocellulosic agricultural residue, lignin materials, lignin derivatives or mixtures thereof; and a defoamer.

In a feature of the first aspect, the lignin material of the organic slurry dispersion comprises one or more byproducts of a pulping process, wherein the pulping process is selected from the group consisting of kraft pulping, sulfite pulping, ASAM organosolv pulping, acid hydrolysis, soda pulping, Alcell® pulping, Organocell pulping, Acetosolv pulping, and combinations thereof. Further, regarding this feature, the lignin material comprises one or more byproducts of kraft pulping. Even further yet, the lignin material is dewatered, kraft lignin. In some embodiments, the dewatered, kraft lignin is acid precipitated and acid washed prior to being dewatered.

In an additional feature of the first aspect, the one or more fillers are organic fillers. With regard to this feature, the organic fillers may be comprise lignocellulosic agricultural residue selected from the group consisting of tree bark, wood flour, nut shells, seed hulls, corn cobs, sugar beet residuals, sugar cane residuals, and mixtures thereof.

In a further feature of the first aspect, the adhesive resin is a phenol formaldehyde resin. In yet another feature of the first aspect, the pH of the organic slurry dispersion is equal to or less than neutral.

In a second aspect of the invention, a process of making an adhesive mixture for use with a composite wood product, includes introducing an adhesive resin to a mixing device; introducing water to the mixing device; introducing one or more fillers into the mixing device; introducing an organic slurry dispersion to the mixing device, the organic slurry dispersion comprising water; a dewatered, kraft lignin insoluble in the water; and a defoamer; and combining and mixing the adhesive resin, the water, the one or more fillers and the organic slurry dispersion in the mixing device to form an adhesive mixture.

In a feature of this aspect, a rotor-stator is used to impart a high degree of shear and mixing on the organic slurry dispersion. In a further feature, the process further comprises preparing the organic slurry dispersion by combining and mixing water, the dewatered, kraft lignin insoluble in the water; and the defoamer thereby producing the organic slurry dispersion. In addition, combining and mixing may comprise imparting high shear and mixing on the water, a dewatered, kraft lignin insoluble in the water; and defoamer.

In a third aspect of the invention, a method of applying an adhesive mixture for use in manufacturing a wood-based composite, includes introducing an adhesive resin to a mixing device; introducing water to the mixing device; introducing one or more fillers into the mixing device; introducing an organic slurry dispersion to the mixing device, the organic slurry filler enhancer comprising water; a dewatered, kraft lignin insoluble in the water; and a defoamer; combining and mixing the adhesive resin, the water, the one or more fillers and the organic slurry dispersion in the mixing device to form an adhesive mixture; and applying the adhesive mixture to wood material for use in manufacturing a wood-based composite product.

DETAILED DESCRIPTION

An adhesive mixture comprising an organic slurry dispersion for use in the manufacture of wood-based composites is described herein. The adhesive mixture includes an adhesive resin; water; one or more fillers; an organic slurry dispersion, and a defoamer. The terms "adhesive mixture" and "gluemix" are used interchangeably herein.

The adhesive mixture includes at least one adhesive resin. Adhesive resins are generally used in the manufacture of gluemixes for wood-based composite products. For the manufacture of plywood, one of the most common resin systems used in gluemixes are those comprising phenol formaldehyde ("PF") resins. PF resins are known to be prepared from two main chemicals (phenol and formaldehyde) that are reacted at elevated temperatures through methylolation and condensation to form a phenolic polymer. In some embodiments, the phenol formaldehyde resin may be of the resol type. Other resins used for wood-based composite products include, but are not limited to, urea-formaldehyde, melamine-formaldehyde and urea-melamine formaldehyde. In a preferred embodiment, the gluemix comprises a resol-type PF resin.

The adhesive mixture also includes one or more fillers. Fillers are materials that are more inert than extenders and have been demonstrated to have an effect on liquid glue properties, such as low shear viscosity, shear-dependent flow (thixostropy) and water retention. Together, these attributes can have a profound effect on the gluemix stability, application consistency, resistance to penetration or dryout on a veneer surface, and tolerance for local variations in veneer moisture content. Fillers, although, are not believed to contribute to, or participate in direct adhesion, are responsible for keeping the glue available at the bonding surface. Fillers may be organic or inorganic. Examples of organic fillers for use with a gluemixes include lignocellulosic agricultural residues such as tree bark, wood flour, nut shells, seed hulls, corn cobs, sugar beet residuals, sugar cane residuals, or mixtures thereof. Examples of inorganic fillers may include various mineral compounds or clay thickeners.

The gluemix may also include additional additives, such as extenders. Extenders are materials that can swell in a high pH gluemix, and can add to the overall adhesion of the gluemix. Examples of extenders for use with a plywood gluemixes include lignocellulosic and non-lignocellulosic agricultural residue such as wheat flour, wheat bran, corn flour, corn starch, rice flour, various forms of soy flour, soy meal, or mixtures thereof.

The gluemix further includes an organic slurry dispersion. The organic slurry dispersion is added to the gluemix as a filler enhancer, as will be described below and shown in the Examples. The organic slurry dispersion comprises water; a natural biopolymer insoluble in the water, and a defoamer. The natural biopolymer is typically insoluble in water. In some embodiments, the natural biopolymer comprises lignocelluloses, lignocellulosic agricultural residue, lignin materials, lignin derivatives or mixtures thereof. As used herein, the term "lignocelluloses" refers to the collection of biopolymers that make up plant material cell walls. The term "lignocelluloses" includes the three broad polymer categories that are present in plant cell walls, namely cellulose, hemicelluloses and lignin. As used herein, the term "lignin material" refers to one or more byproducts of a pulping process, which is recovered during or after pulping of lignocellulosic material. The term "lignin material" is used because the lignin may be extracted in a variety of ways, each of which can alter the chemistry, purity, molecular weight and reactivity of the lignin. The pulp can be from any suitable lignocellulosic material including hardwoods, softwoods, annual fibers, and combinations thereof. Exemplary pulping processes include kraft pulping, sulfite pulping processes, organosolv pulping processes, soda pulping, enzymatic hydrolysis, super critical water extraction process, and biomass disintegration. More specific examples include kraft pulping, sulfite pulping, ASAM organosolv pulping, acid hydrolysis, Alcell® pulping, Organocell pulping, Acetosolv pulping, lignin extraction from an enzymatic hydrolysis process, super critical water extraction process and any other biomass disintegration process. The term "lignocellulosic agricultural residue" refers to pulverized, ground or powder forms of agricultural residue. Lignocellulosic agricultural residue may comprise ground, pulverized, or powder forms of tree bark, wood flour, nut shells, seed hulls, corn cobs, sugar beet residuals, sugar cane residuals, and mixtures thereof. As used herein, the term "lignin derivatives" refers to lignin material that has been derivatized with additional chemical functional groups, such as lignosulfonates.

In some embodiments, the natural lignin material may comprise dewatered, kraft lignin. In a preferred embodiment, the lignin material may comprise neutral to acidic dewatered, kraft lignin. This dewatered, kraft lignin has been acid precipitated out of solution from the highly alkaline "black liquor" left over from the pulping process. After the lignin has washed, this acidic form of lignin is insoluble in neutral to acidic water. In other words, the acidic form of lignin is insoluble in water having a pH of neutral or less. Further along in processing, the precipitate is concentrated, and dewatered through filter pressing. The lignin solids, having been chemically extracted, are not particles with a hierarchical cellular structure. Rather, the lignin solids are highly agglomerated. Despite being highly agglomerated, the lignin solids are still discrete, polymer molecules with nanometer scale-dimensions.

The dewatered, kraft lignin is damp and chunky. Because the dewatered, kraft lignin is so compact, traditional overhead, impeller-style mixers do not effectively de-agglomerate and disperse the chunky lignin in a water-based system at neutral to low pH. Techniques such as dissolving the lignin first in a highly alkaline solution at an elevated temperature have been utilized, but these techniques may pose a safety risk. In addition, dissolving the lignin in an alkaline solution can add inorganic salts to the material, which may increase its ash content. Alternative techniques used previously include drying the dewatered, kraft lignin prior to use. However, this technique also provides challenges, including increased production costs, creation of dust hazards, and other complications.

By contrast, the embodiments of the organic slurry dispersion used in embodiments of the gluemixes of the present invention is formed by combining and mixing water, the dewatered, kraft lignin, and pH modifier are be combined in a vessel and mixed by imparting high shear on the mixture. The high shear mixing effectively disperses the highly agglomerated lignin solids without having to dissolve them at high pH or high temperature. Accordingly, the acidic to neutral pH dewatered, kraft lignin may be used in its damp and chunky form, which makes it cost-effective. The resulting organic slurry dispersion has high solids content. In one example, the organic slurry dispersion may comprise from about 20% solids to about 90% solids. In a further example, the organic slurry dispersion may comprise from about 30% solids to about 70% solids. In a yet further example, the organic slurry dispersion may comprise about 40% solids. Furthermore, the resulting organic slurry dispersion has a particle size below 150 microns. Exemplary high shear mixers that can be used include a high shear, single or multi-stage homogenizer, a high-speed mixer, and a rotor-stator. Any device capable of inducing a high degree of shear and mixing on the organic slurry dispersion is suitable for use.

The water of the organic slurry dispersion used in the adhesive mixture may be present in an amount from 10 wt % to 60 wt % of the organic slurry dispersion. The natural biopolymer may be present in an amount of 20 wt % to 90 wt % of the organic slurry. For example, the natural biopolymer may be present in an amount of 20 wt % to 70 wt % of the slurry.

The organic slurry dispersion may include other additives including pH modifiers, rheology modifiers, and biocides. The pH modifier may include any of the pH modifiers listed above, such as, for example, alkali salts. The pH modifier may be present in an amount of up to 1 wt % of the organic slurry dispersion. The use of a pH modifier is to maintain the pH of the organic slurry dispersion as acidic or neutral, as discussed above.

Figure 1:
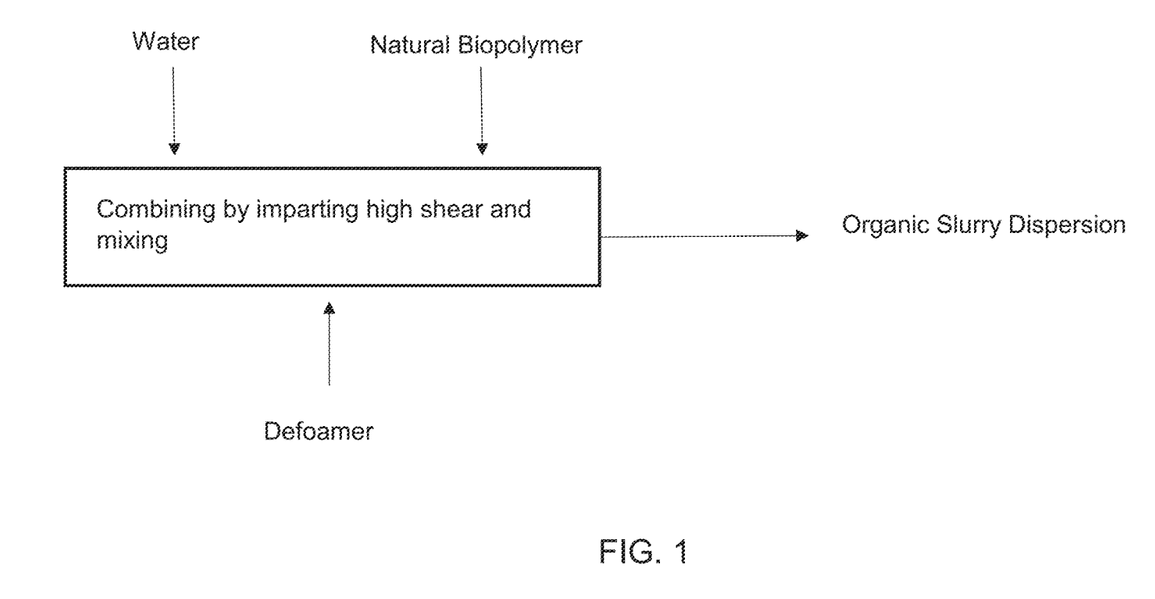
FIG. 1 is a schematic representation of a process for the manufacturing of an embodiment of an organic slurry dispersion in accordance with an aspect of the present invention.

FIG. 1 provides a schematic representation of a process for the manufacturing of an embodiment of an organic slurry dispersion. The process to prepare the organic slurry dispersion includes introducing water into a vessel; introducing the natural biopolymer into the vessel; and introducing the defoamer into the vessel. The components are then combined and mixed by imparting high shear on the mixture. In some embodiments, a rotor-stator could be used to impart high shear on the organic slurry dispersion. A process of preparing an organic slurry dispersion comprising a natural bio-polymer is described in U.S. patent application Ser. No. 16/464,857, the entire contents of which are hereby incorporated herein by reference.

Figure 2:
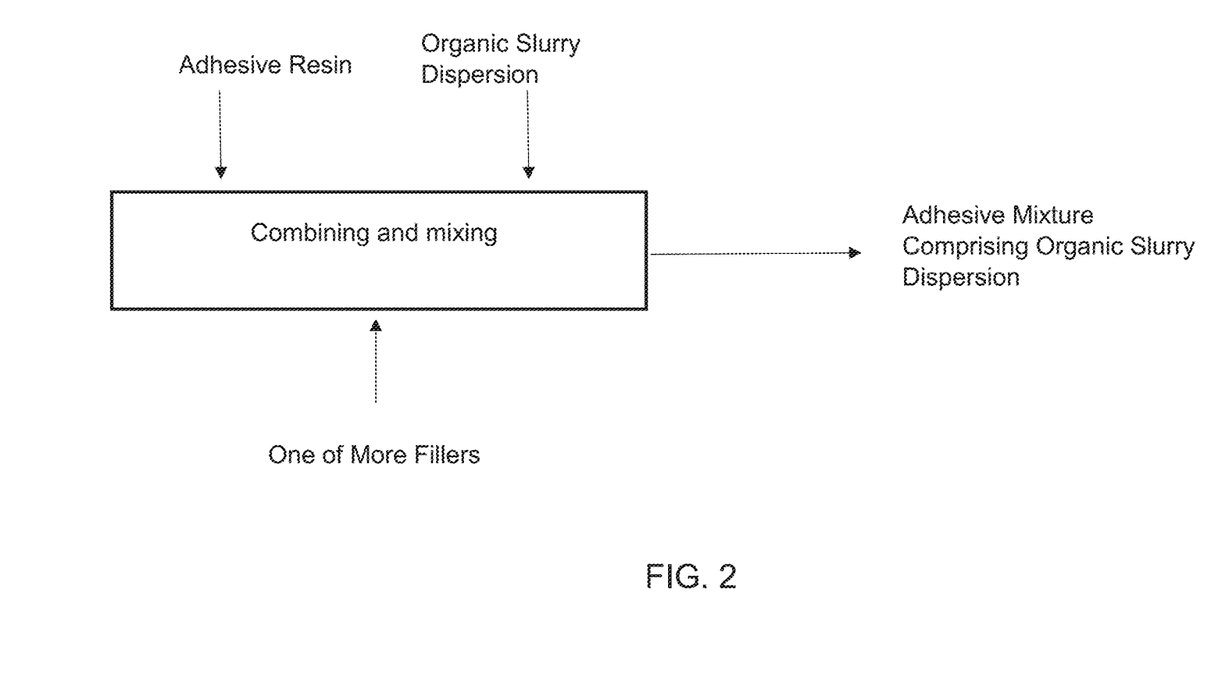
FIG. 2 is a schematic representation of a process for the manufacturing of an embodiment of an adhesive mixture in accordance with an aspect of the present invention.

FIG. 2 is a schematic representation of a process for the manufacturing of an embodiment of a gluemix. The gluemix may be formed by combining and mixing adhesive resin, water, one or more fillers, and the organic slurry dispersion in a mixing device. Once formed, the adhesive mixture may be applied to wood material for use to manufacture a wood-based composite product. This application of the adhesive mixture to the wood material may be performed using methods known to those of ordinary skill in the art.

The one or more fillers and the organic slurry dispersion combine to account for the total amount of solids in the gluemix. The gluemix may comprise 30 wt % to 70 wt % total solids. Thus, the gluemix may comprise 30 wt %-70 wt %, 32 wt %-68 wt %, 34 wt %-66 wt %, 36 wt %-64 wt %, 38 wt %-62 wt %, 40 wt %-60 wt %, 42 wt %-60 wt %, 44 wt %-60 wt %, 46 wt %-60 wt %, 46 wt %-58 wt %, 46 wt %-56 wt %, 46 wt %-54 wt %, or 40%-52 wt %. For example, the organic slurry dispersion may comprise from 30 wt % up to 32 wt %, up to 34 wt %, up to 36 wt %, up to 38 wt %, up to 40 wt %, up to 41 wt %, up to 42 wt %, up to 43 wt %, up to 44 wt %, up to 45 wt %, up to 46 wt %, up to 47 wt %, up to 48 wt %, up to 49 wt %, up to 50 wt %, up to 51 wt %, up to 52 wt %, up to 53 wt %, up to 54 wt %, up to 55 wt %, up to 56 wt %, up to 57 wt %, up to 58 wt %, up to 59 wt %, up to 60 wt %, up to 62 wt %, up to 64 wt %, up to 66 wt %, up to 68 wt %, or up to 70 wt % total solids. In one embodiment, the gluemix comprises about 40 wt % of total solids.

In preparing a gluemix for use in the preparation of wood-based composite materials, one of skill in the art understands that the specific composition of a base PF resin (i.e. molecular weight, formaldehyde-to-phenol ratio, and alkalinity), as well as the concentration and types of additives in the gluemix can all be adjusted for various target performance needs. One of ordinary skill understands that adjustments to the gluemix are important to maximizing process efficiency, product quality, which both result in value to the plywood or resin manufacturer i.e. higher performance or cost savings). For example, gluemixes may be adjusted based on the following factors: 1) wood factors such as species, surface quality, moisture content and porosity; 2) processing factors such as line speed, application method (spray, extrusion, curtain coating roll coater, etc.), veneer and/or ambient temperature, seasonality, press temperature and speed, and/or prepress parameters; and 3) mix type (i.e. a ready-to-use premixed glue directly supplied to the plywood manufacturer, or a gluemix made on site at a plywood production facility). However, these adjustments may have a direct impact on how much glue is needed to achieve an adequate bond. Some challenges include: over penetration of glue into the porous wood veneer; dryout of the glue on the surface; poor prepress consolidation which may limit green-strength development during prepressing to hold loose veneers together to avoid misalignment or veneer folding prior to hot pressing; inconsistent application; and dryer constraints and inefficiencies that can cause non-uniform moisture contents across veneer surfaces. To address these challenges, premium fillers, such as corn cob residue, have been utilized. These premium fillers are known to allow for reduced adhesive application levels, improved prepress consolidation, and superior bond quality as compared to other filler materials. However, the cost and availability of such premium fillers makes them a limiting factor for some plywood or resin manufacturers. Thus, there is a need to provide a gluemix that provides the same benefits but is more economical and readily available.

A gluemix comprising the organic slurry dispersion as filler enhancement has been found to improve the value and performance of filler materials that have less substantial improvements to the above-mentioned common challenges. The organic slurry dispersion, added as a replacement of a selected amount of solids from the one or more fillers, has been shown to increase the stability of the glue mix; increase the system homogeneity and resistance to phase separation; increase the consistency of the gluemix rheology in response to shear, which leads to more uniform application and subsequent bond quality across the panel area; increased prepress consolidation and green-strength development; and allow for reduced glue mix application/spread levels than a corresponding gluemix comprising the same amount of total solids provided by only filler solids. In some embodiments, the organic slurry dispersion comprises 10% of the total solids of the gluemix. In alternative embodiments, the organic slurry dispersion comprises 20% of the total solids of the gluemix. In still further embodiments, the organic slurry dispersion comprises more than 20% of the total solids of the gluemix. The organic slurry dispersion serves as a consistent and cost-effective delivery mechanism to bring the benefits of acidic to neutral pH dewatered, kraft lignin to a gluemix. In addition, the organic slurry dispersion provides a convenient delivery mechanism for liquid-to-liquid addition to incorporate lignin solids into a downstream water-based product without the need for powder feeding technology.

Historically, acidic to neutral pH dewatered, kraft lignin in a water-based composition was not used water-based resin gluemixes as it was not believed to be possible. As described above, damp and chunky dewatered, kraft lignin posed two challenges. First, unless the dewatered, kraft lignin was dried, which increases costs and the dust hazard nature of the product, the industrial process must allow for additional water delivered with the lignin. The second challenge was the lignin agglomeration. Liquid product uniformity, stability, and application efficiency typically require dispersed solid particles to be below a certain size. The dewatered, kraft lignin is so compact that traditional overhead, impeller-style mixers do not effectively de-agglomerate and disperse the chunky lignin in a water-based system at neutral to low pH. Secondly, due to the lignin agglomeration, required dissolving the dewatered, kraft lignin first in a highly alkaline solution, often at an elevated temperature. The process can pose a safety risk and can add inorganic salts to the material, which can increase its ash content. Accordingly, acidic to neutral pH dewatered, kraft lignin was not considered for use with gluemix production.

As shown in the Example section below, the embodiments of the adhesive mixture comprising an organic slurry dispersion as a filler enhancer provide increases in the stability and homogeneity of the gluemix; improvement on the consistency of the rheological response of the gluemix; and increased green strength of the gluemix as compared to a control gluemix comprising only filler solids.

EXAMPLES

Example 1

Figure 3:
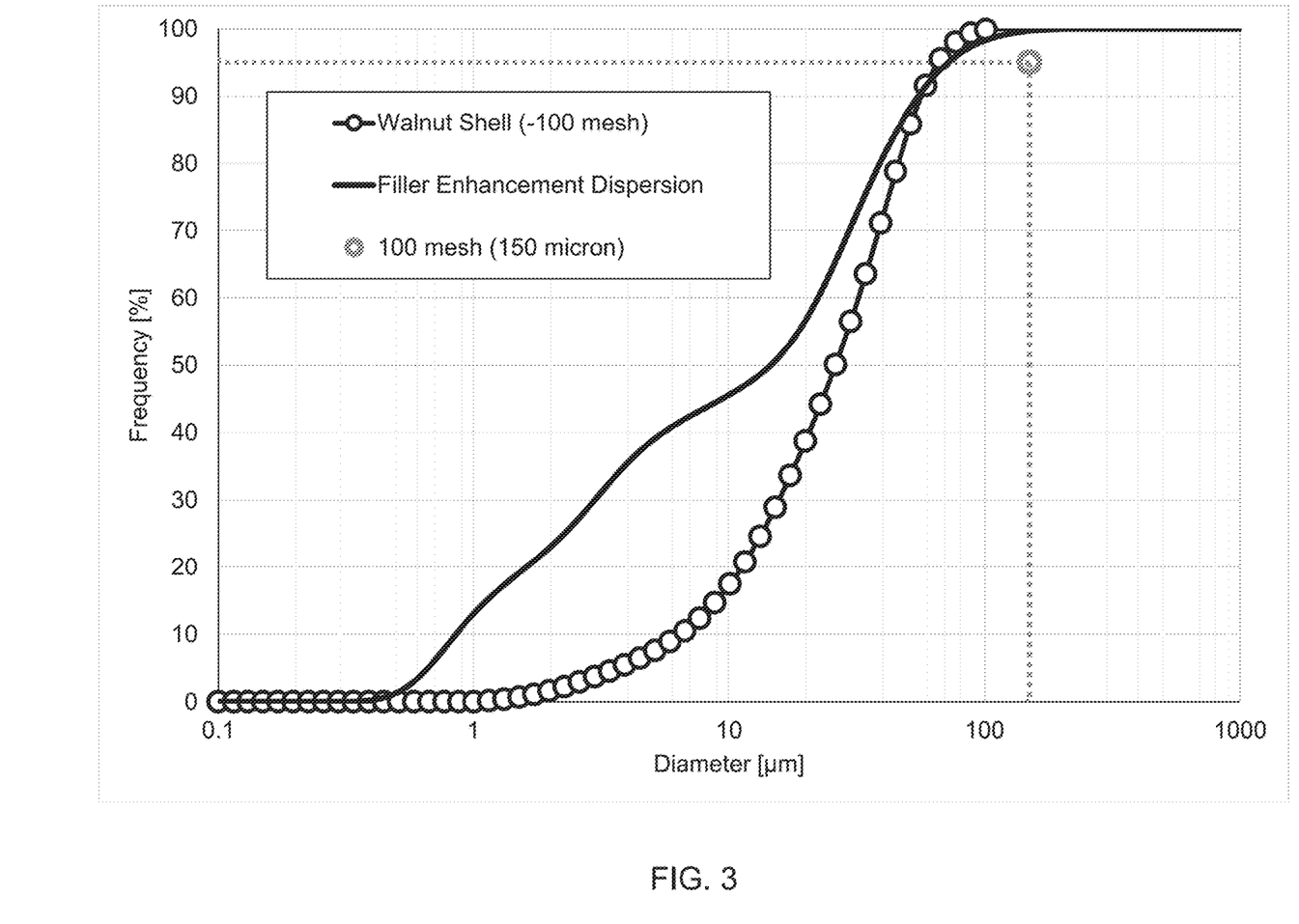
FIG. 3 is a graphical representation of a cumulative distribution curve of filler particle size related to Example 1.

In this example, an embodiment of an organic slurry dispersion for use in an embodiment of an adhesive mixture, or gluemix, is provided. In this embodiment, the water-based organic slurry dispersion is produced to contain approximately 40% solids. The starting lignin product, is a damp, chunky, dewatered, kraft lignin, consisting of approximately 35% moisture, and having a pH between 2 and 4 (10% solids in water). The dispersion is formed by passing approximately 906 g of this damp kraft lignin product, 580 g of water, 2.5 g of an oil based defoamer, and 2.6 g of a thickener through an in-line, high shear disperser until the appropriate particle size is achieved. Between 0-3 g of sodium carbonate is added to the product to bring the pH to a uniform target of approximately 5. The final dispersion is filtered through a 250-micrometer mesh filter, and has a resulting particle size distribution less than or equal to conventional plywood gluemix fillers; i.e. 95% passing through a standard 100 mesh sieve, as depicted in FIG. 3.

Further, this example provides preparation of a control gluemix and an embodiment of an adhesive mixture of the present invention is provided. A 900 g batch of a standard plywood gluemix using a commodity filler for use as a control is prepared as follows. A cowels blade roughly one third of the diameter of the mixing container should be used and raised off the bottom enough to thoroughly mix the entire batch while ensuring the teeth are wetted. First, 197 g of water (25° C.) is added to the container and the mixer is turned on to create a strong vortex without entraining air. Next, in order, 53.6 g of walnut shell (or other commodity filler), 55 g wheat flour, and 7.1 g of sodium carbonate are added to the container. The components are mixed for 5 minutes maintaining an aggressive vortex. Arclin® Liquid Phenol Formaldehyde Resin A33 was the backbone PF resin used in this example. The total resin amount in the batch is added over two separate steps, referred to as resin drops. The ratio of first to second resin drop amounts influences the final mix target viscosity. A lower amount in the initial drop results in a higher mix viscosity while a greater amount leads to a lower mix viscosity. This ratio also varies depending on the filler being used. For the walnut shell mix, 285 g of resin (25° C.) is added to the container then aggressively mixed for 5 minutes. Next, 27.3 g of sodium hydroxide is slowly added and then mixed for 10 minutes. The mix should thicken significantly after this step. The final resin drop of 274.5 g is then added to the container, mixing for 3 minutes after all components are in the container. Table 1 shows this control mix procedure. The finished mix density is 1.2 g/cm$^3$. The final viscosity is measured using a Brookfield viscometer, #4 spindle at 20 rpm, and should be between 1300-1600 cP at 38° C. The resulting gluemix solids are approximately 40.6%.

TABLE 1

| Control walnut shell gluemix; 900 g total batch | | | |
|---|---|---|---|
| Step | Material | Weight [%] | Weight [g] |
| 1 | Water @ 77° F. | 21.92 | 197.28 |
| 2 | Walnut shell filler- | 5.96 | 53.64 |
| 3 | Wheat flour extender | 6.12 | 55.08 |
| 4 | Soda Ash | 0.79 | 7.11 |
| 5 | Mix for 5 minutes | | |
| 6 | Resin 1 | 31.68 | 285.12 |
| 7 | Mix for 5 minutes | | |
| 8 | 50% NaOH | 3.03 | 27.27 |
| 9 | Mix for 10 minutes | | |
| 10 | Resin 2 | 30.50 | 274.50 |
| 11 | Mix for 3 minutes | | |
| Totals | | 100.00 | 900.00 |

The gluemix containing a 20% replacement of commodity filler with the embodiment of the organic slurry dispersion as a filler-enhancement-dispersion (FED) follows the same general steps as the standard gluemix. The replacement is done by substituting 20% of the walnut shell filler solids with FED solids; note, 80% of the filler loading is still walnut shell. Because the FED mix is 40% solids, the excess water is removed from the initial water addition and incorporated with the FED to maintain a total mix solids content of 40.6%. For example, 182 g of water is added upfront, then 42.9 g of walnut shell, 55 g wheat flour, 7.1 g sodium carbonate, and finally 26.8 g FED. These components are aggressively mixed for 5 minutes and then first resin drop (25° C.) of 243.5 g is added and similarly mixed for 5 more minutes. Slowly, 27.3 g of sodium hydroxide is added to the batch significantly thickening the mix. These components are aggressively mixed for 10 minutes. The final resin drop of 315 g (25° C.) is then added and mixed for 3 minutes. Note that the resin drop ratio is different with the incorporation of FED. To achieve the same target final viscosity, the solids concentration is greater in the presence of the FED. Table 2 shows this modified mix procedure with the FED. The final mix density and viscosity are equivalent to the control walnut shell mix.

TABLE 2

Modified gluemix with 20% organic slurry dispersion used as a filler enhancement dispersion substitution for walnut shell solids; 900 g total batch

| Step | Material | Weight [%] | Weight [g] |
|---|---|---|---|
| 1 | Water @ 77 F | 20.26 | 182.33 |
| 2 | Walnut shell filler | 4.77 | 42.91 |
| 3 | Wheat flour extender | 6.12 | 55.08 |
| 4 | Soda Ash | 0.79 | 7.11 |
| 5 | 40% Solids F.E.D. | 2.98 | 26.82 |
| 6 | Mix for 5 minutes | | |
| 7 | Resin 1 | 27.05 | 243.48 |
| 8 | Mix for 5 minutes | | |
| 9 | 50% NaOH | 3.03 | 27.27 |
| 10 | Mix for 10 minutes | | |
| 11 | Resin 2 | 35.00 | 315.00 |
| 12 | Mix for 3 minutes | | |
| | Totals | 100.00 | 900.00 |

Example 2

Figure 4:
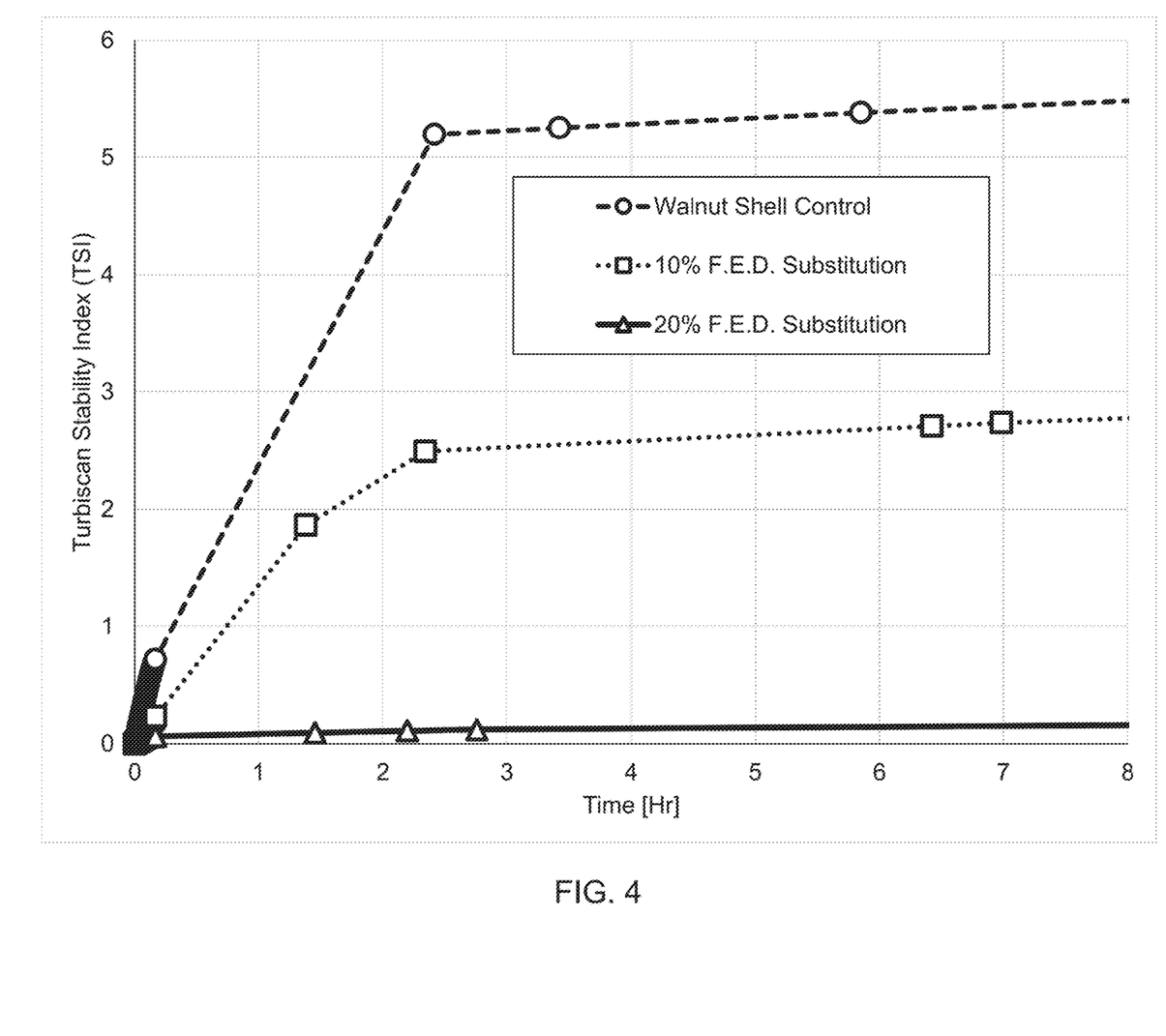
FIG. 4 is a chart showing the Turbiscan Stability Index for a group of adhesive mixtures.

In this example, stability and homogeneity testing of the embodiment of the adhesive mixture, or gluemix, comprising the embodiment of an organic slurry dispersion described in Example 1 was performed. As shown, the embodiment of gluemix comprising the organic slurry dispersion used as a filler enhancement dispersion substitution level of 20% as described in Example 1 provides a significant increase in the stability and homogeneity of the final gluemix. FIG. 4 shows the Turbiscan Stability Index (TSI) results comparing the walnut shell control mix (from Example 1) with two different substitution levels of FED solids vs. walnut shell solids. Data collected with the Turbiscan Lab; the TSI is a calculation of the change in laser light back scattering along the height of the sample vial (20 mL samples at 30° C.). The lower the TSI the lower the change in the backscattering relative to an initial measurement of the sample. In other words, the lower the TSI the higher the stability of the gluemix. The change in back scattering could represent domain size changes, particle size growth or agglomeration, settling or air release.

The walnut shell control mix showed a rapid reduction in stability (i.e., significant increase in TSI) over the first 10 minutes. After approximately 2.5 hours, the TSI for the control was over 5. A 10% replacement of walnut shell filler solids with FED solids resulted in almost a 50% improvement in the TSI. A 20% replacement of walnut shell filler solids with FED solids resulted in more than a 98% improvement in the TSI. There was little additional improvement in the TSI increasing the FED replacement beyond 20%. This indicates that adding the FED has a significant positive impact on the homogeneity and shelf stability of a gluemix, even at low substitution levels.

Example 3

Figure 5:
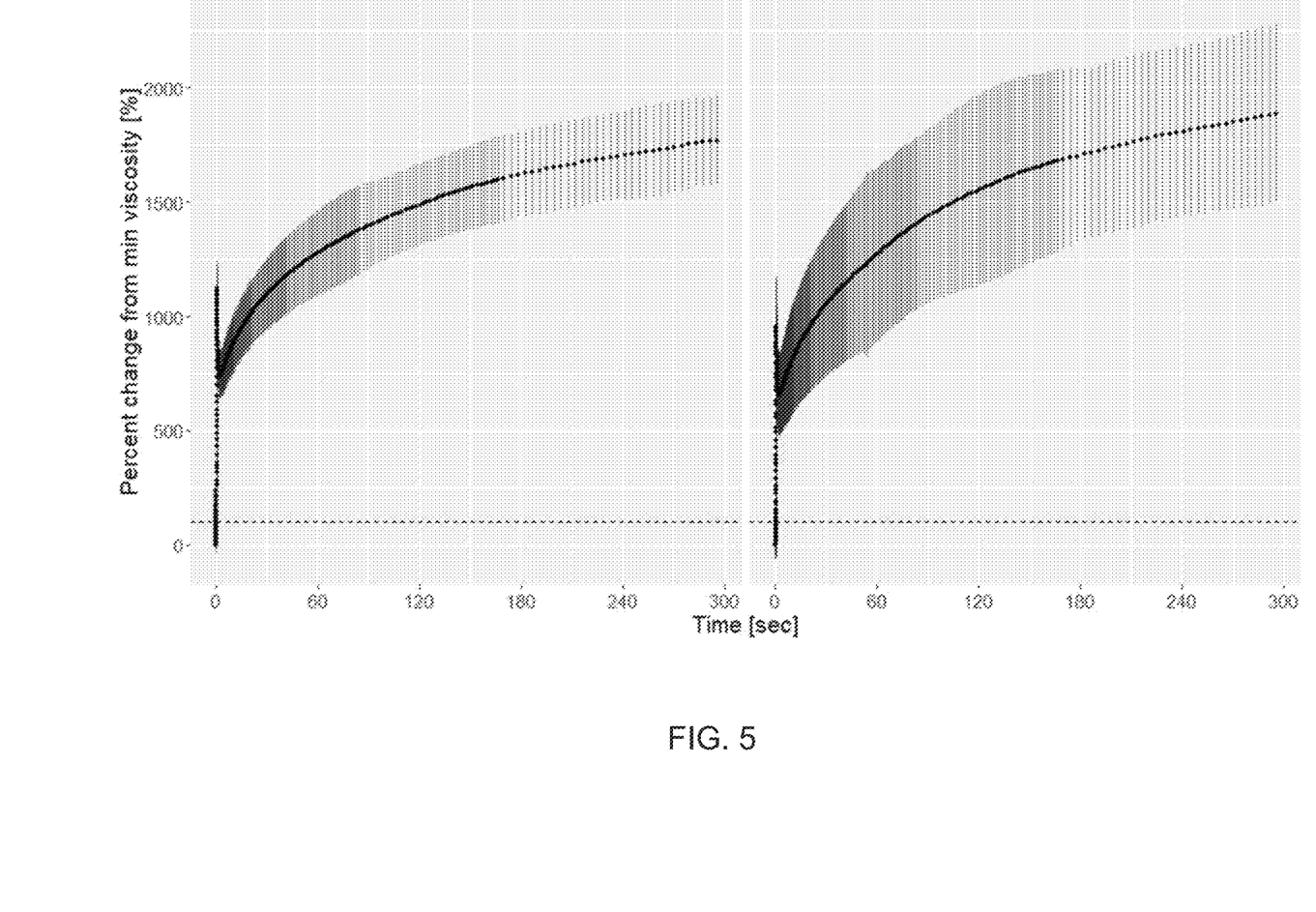
FIG. 5 is a chart showing average viscosity recovery curves comparing an embodiment of an adhesive mixture of the present invention and a control adhesive mixture.

In this example, consistency of the rheological response of the embodiment of the adhesive mixture, or gluemix, comprising the embodiment of an organic slurry dispersion described in Example 1 to high shear was performed. As shown, the embodiment of gluemix comprising the organic slurry dispersion used as a filler enhancement dispersion (FED) substitution level of 20% as described in Example 1 has a significant improvement on the consistency of the rheological response of the gluemix when exposed to high shear. FIG. 5 shows the average of 3 replicate rheology curves comparing a walnut shell control with FED gluemix, where 20% of the walnut shell filler solids were replaced with FED solids. These curves show the viscosity recovery at $0.1$ $s^{-1}$ over 5 minutes after exposure to high shear at $3000$ $s^{-1}$, expressed as a percent increase relative to the minimum viscosity seen at high shear. The average of three experimental replications are provided with error bars representing a 95% confidence interval for each time point.

This experiment is analogous to how the gluemix responds after application onto plywood veneer surfaces. Most industrial processes expose the gluemix to high shear in the form of spray, extrusion, roll coaters or curtain coaters. The fillers and extenders in the liquid glue make the system shear thinning, but immediately after application, the glue is in a very low shear condition, simply resting on the veneers surface. The speed and magnitude of the viscosity recovery back to a thick liquid gluemix affects how readily the glue penetrates into the veneer surface.

While both gluemix types in FIG. 5 show a similar average viscosity recovery, it is apparent that the 20% FED replacement condition is far more consistent between replications. Application consistency is incredibly important in an industrial process. Inconsistency can result in either poor product performance, or the wasteful over application of glue. This improvement in consistency for the 20% FED condition is consistent with the observed gluemix stability improvements seen in Example 2, FIG. 4.

Example 4

Figure 6:
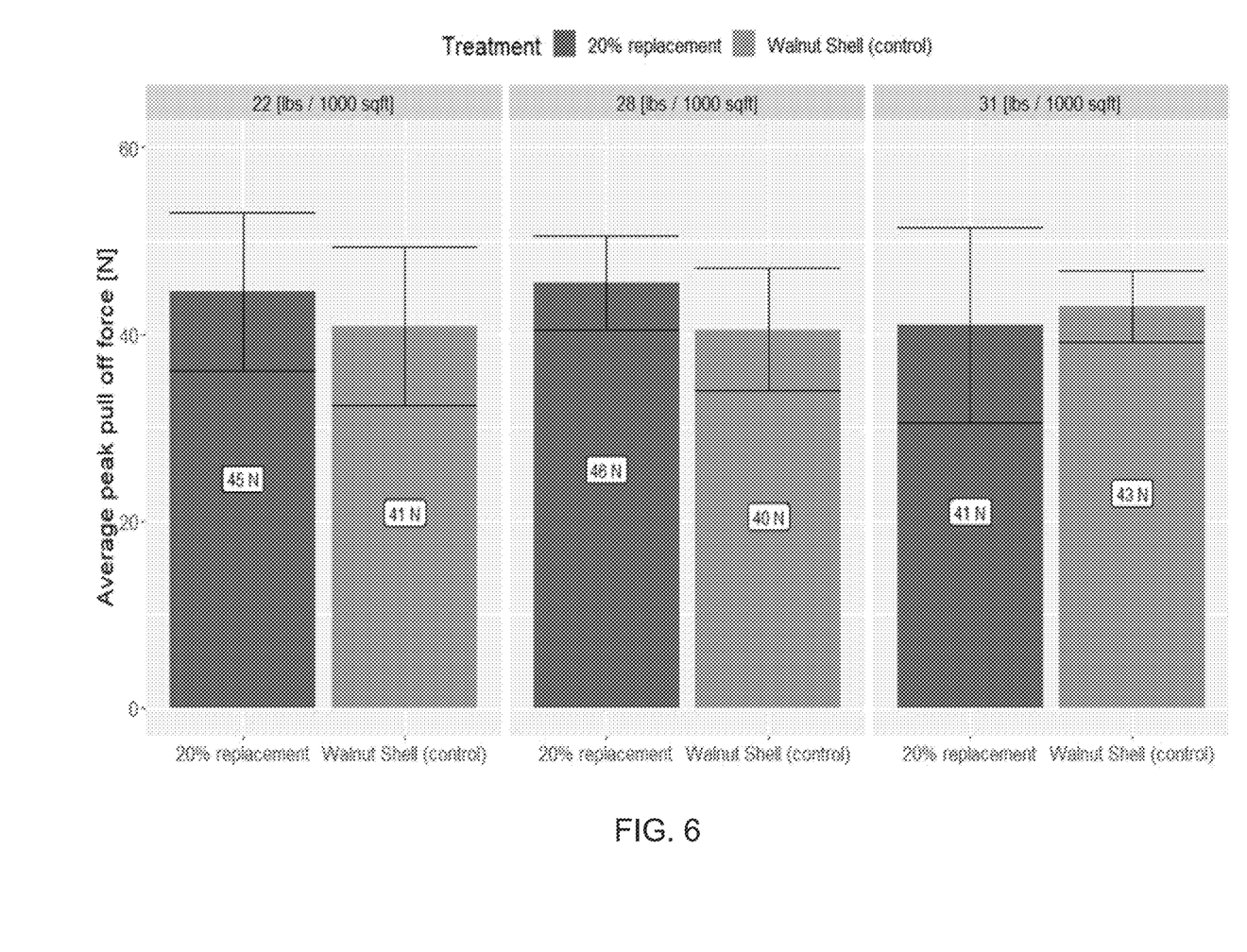
FIG. 6 is a chart average peak pull off force comparing an embodiment of an adhesive mixture of the present invention and a control adhesive mixture at different application levels.

In this example, gluemix green strength testing of the embodiment of the adhesive mixture, or gluemix, comprising the embodiment of an organic slurry dispersion described in Example 1 was performed. Plywood gluemix green strength, also referred to as tack, is of vital importance to prepress consolidation of the veneer layup. This in turn effects resin transfer that influences bond quality and mat integrity as panels are loaded into the hot press. FIG. 6 shows lab-scale green strength data comparing the control walnut shell gluemix with the 20% replacement of the walnut shell filler solids with filler enhancement dispersion (FED) solids, at three representative glue mix application rates. The peak pull off force represents the max tensile force needed to raise a 20 mm stainless steel parallel plate geometry (pull off rate=5 μm/second) from the specimen surface after simulated prepress consolidation (30 minutes, 2 N normal force). This experiment was conducted on yellow-poplar wood specimens with the indicated gluemix spread levels using a Discovery HR1 Rheometer.

It is apparent that the 20% FED substitution condition did not compromise green strength relative to the walnut shell control. In fact, the trend indicates green strength increased for the 20% FED condition relative to the walnut shell control at reduced gluemix application levels.

Any other undisclosed or incidental details of the production or composition of the various elements of the disclosed embodiments of the present invention are not believe to be critical to the achievement of the advantages of the present invention, so long as the elements possess the attributes needed for them to perform as disclosed. The selection of these and other details of construction are believed to be well within the ability of one of even rudimentary skills in this area in view of the present disclosure. Illustrative embodiments of the present invention have been described in considerable detail for the purpose of disclosing a practical, operative composition whereby the invention may be practiced advantageously. The designs described herein are intended to be examples only. The novel characteristics of the invention may be incorporated in other forms without departing from the spirit and scope of the invention.

What is claimed is:

1. An adhesive mixture, comprising:
   a liquid adhesive resin comprising a resol-type phenol formaldehyde;
   water;
   one or more fillers; and
   an organic slurry dispersion, the organic slurry dispersion comprising
      water;
      a natural biopolymer insoluble in the water, the natural biopolymer comprising lignocelluloses, lignocellulosic agricultural residue, lignin materials, lignin derivatives or mixtures thereof; and
      a defoamer,
   wherein the adhesive mixture is a liquid.

2. The adhesive mixture of claim 1, wherein the lignin material of the organic slurry dispersion comprises one or more byproducts of a pulping process, wherein the pulping process is selected from the group consisting of kraft pulping, sulfite pulping, ASAM organosolv pulping, acid hydrolysis, soda pulping, Organocell pulping, Acetosolv pulping, and combinations thereof.

3. The adhesive mixture of claim 1, wherein the natural biopolymer of the organic slurry dispersion comprises one or more byproducts of kraft pulping.

4. The adhesive mixture of claim 3, wherein the natural biopolymer of the organic slurry dispersion comprises dewatered, kraft lignin.

5. The adhesive mixture of claim 4, wherein the dewatered, kraft lignin is acid precipitated and acid washed prior to being dewatered.

6. The adhesive mixture of claim 4, wherein the pH of the dewatered, Kraft lignin is equal to or less than neutral.

7. The adhesive mixture of claim 1, wherein the organic slurry dispersion has a particle size less than 150 microns.

8. The adhesive mixture of claim 1, where the adhesive mixture has solids of 20% to 70%.

9. The adhesive mixture of claim 1, wherein the pH of the organic slurry dispersion is equal to or less than neutral.

10. The adhesive mixture of claim 1, wherein the one or more fillers are organic fillers.

11. The adhesive mixture of claim 10, wherein the one or more fillers comprise lignocellulosic agricultural residue selected from the group consisting of tree bark, wood flour, nut shells, seed hulls, corn cobs, sugar beet residuals, sugar cane residuals, and mixtures thereof.

12. A process of making an adhesive mixture for use with a composite wood product, comprising:
   introducing a liquid adhesive resin comprising a resol-type phenol formaldehyde to a mixing device;
   introducing water to the mixing device;
   introducing one or more fillers into the mixing device;
   introducing an organic slurry dispersion to the mixing device, the organic slurry dispersion comprising water; a dewatered, kraft lignin insoluble in the water; and a defoamer; and
   combining and mixing the adhesive resin, the water, the one or more fillers and the organic slurry dispersion in the mixing device to form an adhesive mixture.

13. The process of claim 12, wherein the dewatered, kraft lignin is acid precipitated and washed prior to being dewatered.

14. The process of claim 12, further comprising preparing the organic slurry dispersion by combining and mixing water, dewatered, kraft lignin and the defoamer.

15. The process of claim 14, wherein a rotor-stator is used to impart a high degree of shear and mixing on the organic slurry dispersion.

16. The process of claim 12, wherein the pH of the organic slurry dispersion is equal to or less than neutral.

17. The process of claim 12, further comprising introducing a pH modifier to the vessel.

18. The process of claim 17, wherein the pH of the organic slurry dispersion is equal to or less than neutral.

19. A method of applying an adhesive mixture for use in manufacturing a wood-based composite, comprising:
   introducing a liquid adhesive resin comprising a resol-type phenol formaldehyde to a mixing device;
   introducing water to the mixing device;
   introducing one or more fillers into the mixing device;
   introducing an organic slurry dispersion to the mixing device, the organic slurry filler enhancer comprising water; a dewatered, kraft lignin insoluble in the water; and a defoamer;
   combining and mixing the adhesive resin, the water, the one or more fillers and the organic slurry dispersion in the mixing device to form an adhesive mixture; and
   applying the adhesive mixture to wood material for use in manufacturing a wood-based composite product.

* * * * *